R. E. HELLMUND.
SYSTEM OF CONTROL.
APPLICATION FILED MAY 2, 1917.
1,308,069.
Patented July 1, 1919.
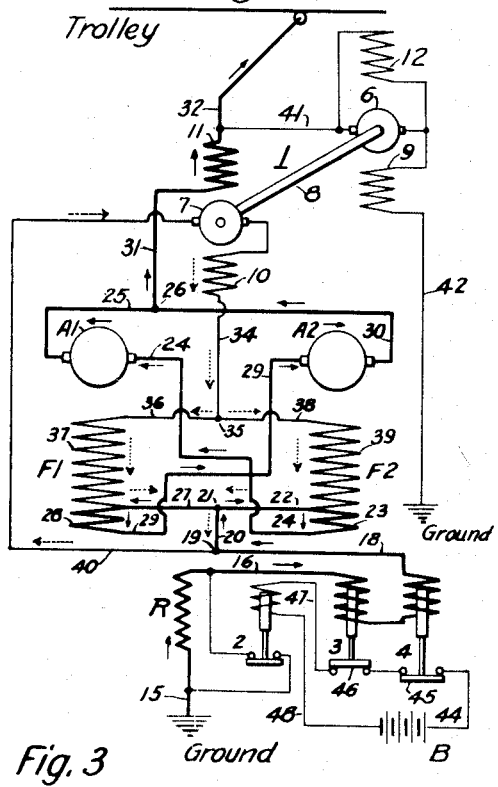
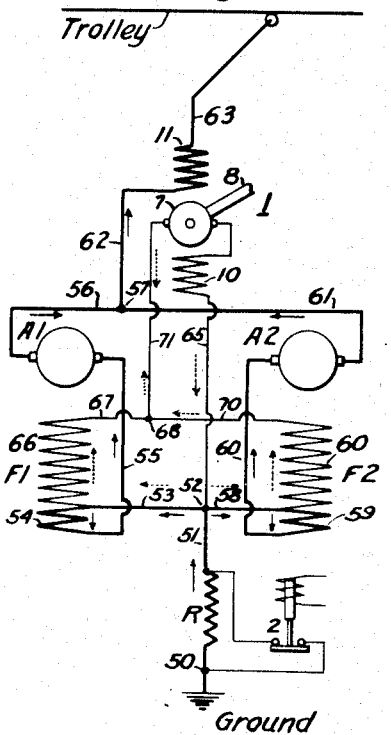
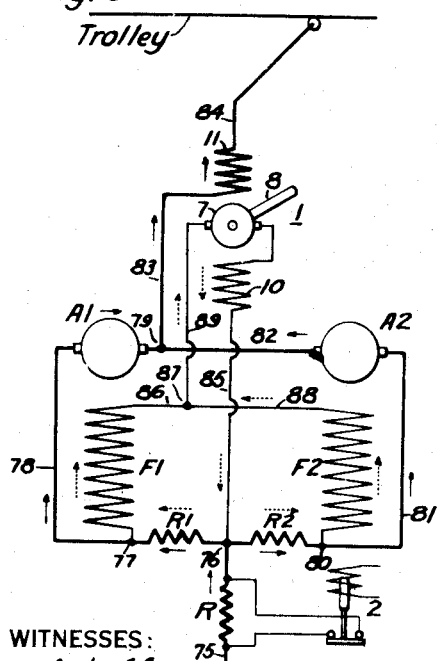
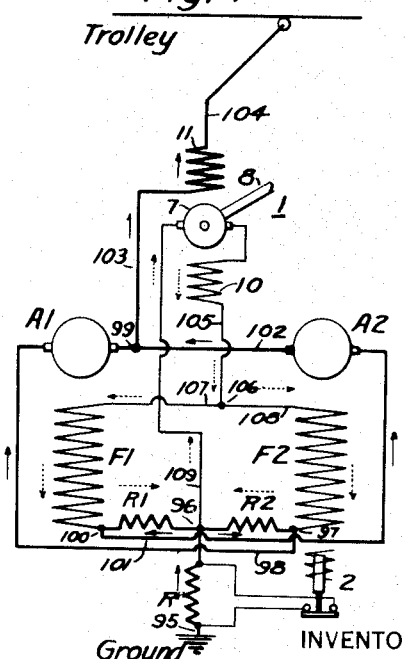
WITNESSES:
Fred. C. Wilharm
W. R. Coley
INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,308,069.   Specification of Letters Patent.   Patented July 1, 1919.

Application filed May 2, 1917.   Serial No. 165,852.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the control of electric vehicle motors and the like during regenerative operation.

The object of my invention is to provide a system of the above-indicated character embodying a plurality of main momentum-driven dynamo-electric machines, an auxiliary exciting machine thereof and an arrangement of circuits whereby a substantially constant regenerated current is maintained without requiring the manipulation of regulating devices and an equal distribution of load between the main machines is also automatically maintained.

My invention may best be understood by reference to the accompanying drawing, wherein Figure 1 is a diagrammatic view of the essential circuit connections of a control system embodying my present invention, and Fig. 2 to Fig. 4, inclusive, are diagrammatic views of modifications of the system that is shown in Fig. 1.

Referring to the first figure, the system shown comprises suitable supply-circuit conductors Trolley and Ground; a plurality of main dynamo-electric machines respectively having commutator-type armatures A1 and A2 and subdivided field windings F1 and F2 of the series type; an auxiliary motor-generator set 1 that is driven from the supply circuit and is connected to excite certain portions of the main field windings; a main-circuit resistor R that is associated with a switch 2 in a manner to be described; a high-current relay device 3 and a low-current relay device 4; and an auxiliary source of energy, such as a battery B.

The motor-generator set 1 comprises a driving or motor armature 6 and a generator or exciting armature 7 that is mechanically associated therewith in any suitable manner, as by a shaft 8. A series-related field winding 9 and a shunt-connected field winding 12 are provided for the auxiliary motor armature 6, while the exciting armature 7 is provided with a series-related field winding 10 and also a regenerated-current-excited field winding 11, the two field windings 10 and 11 being differentially related with respect to each other during the regenerative period, as indicated by the corresponding arrows. It will be understood that the auxiliary driving motor may be of the shunt, series or compound type, dependent upon the desired operating characteristics of the system in general.

Inasmuch as the particular system of acceleration that is employed in connection with the main machines is immaterial to my present invention, I have not deemed it necessary to illustrate or describe such circuit connections and, furthermore, for the sake of simplicity and clearness, I have omitted to show means for initiating regeneration. Any of the circuit arrangements known in the art may be employed in the present instance.

Assuming, therefore, that regenerative operation has been begun with the system connections as illustrated, the main circuit, as indicated by the solid arrows, as established from the supply-circuit conductor Ground, which is of higher potential than the trolley during the regenerative period, through conductor 15, resistor R, which is normally short-circuited by the switch 2, conductor 16, the actuating coils of the high-current and the low-current relay devices 3 and 4, respectively, conductor 18 junction-point 19, conductor 20, junction-point 21, where the main circuit divides, one branch including conductor 22, lower section 23 of the main field winding F2, conductor 24, main armature A1 and conductor 25 to another junction-point 26, and the other branch including conductor 27, lower section 28 of the main field winding F1, conductor 29, main armature A2, and conductor 30 to the junction-point 26, whence a common circuit is continued through conductor 31, regenerated-current-excited field winding 11 of the motor-generator set 1 and conductor 32 to the trolley.

The main-field-winding circuit, as indicated by the dotted arrows, is established from the positive terminal of the auxiliary exciting armature 7 through field winding 10 and conductor 34 to junction-point 35, where the circuit divides, one branch traversing conductor 36, upper section 37 of the main field winding F1 and conductor 27 to the junction-point 21, and the other branch traversing conductor 38, upper section 39 of the main field winding F2 and conductor 22 to the junction-point 21, whence a common circuit is completed through conductor 20, junction-point 19 and conductor 40 to the negative terminal of the exciting armature 7.

A further auxiliary circuit is established from the trolley-energized conductor 32 through conductor 41, auxiliary motor armature 6, field winding 9 thereof and conductor 42 to ground.

By reason of the differential relation of the field windings 10 and 11 for the exciting armature 7, which are respectively energized in accordance with the exciting-armature current and the regenerated current, the braking current generated by the main machines is maintained substantially constant. For example, if the regenerated current traversing the auxiliary field winding 11 tends to increase, the augmented differential effect thereof causes the resultant voltage of the exciting armature 7 to be decreased in such manner that the excitation supplied to the upper sections of the main field windings is also reduced to cause the main-armature current to recede to a normal value. The converse action takes place in the event of an incipient decrease of regenerated current. Thus, by suitable design of parts with respect to the main field windings and the various elements of the auxiliary motor-generator set, the speed of which varies with fluctuations of supply-circuit voltage in the same manner that the regenerated current is effected thereby, a substantially constant braking current of any predetermined value or a given ratio of field-winding current to armature current in the main machine, dependent upon the speed charactertistic of the auxiliary driving motor, may be obtained.

However, as is well-known, two or more parallel-related regenerating machines will not inherently maintain an equal distribution of load by reason of unavoidable manufacturing differences in the machines, which slightly alter their operating characteristics. To insure, therefore, a balancing of the regenerated load between the main machines at all times, I have interconnected each of the main armatures $A^1$ and $A^2$ with the lower section of the non-corresponding field windings $F^2$ and $F^1$, the regenerated current traversing such sections in a direction that aids the excitation of the remaining main field-winding sections from the auxiliary exciting armature 7.

In this way, in case of an incipient increase of current in the main armature $A^1$, the lower section 23 of the non-corresponding field winding $F^2$ is accordingly overexcited to thereby raise the voltage of the other main armature $A^2$ and cause it to absorb a greater portion of the load. A corresponding action occurs whenever the armature $A^2$ tends to take more than its share of the total regenerated current; and a converse regulation takes place whenever the regenerated current of either main armature tends to decrease. Thus, the described system automatically maintains a substantially constant total regenerated current during the braking period and also automatically balances the load between the regenerating machines at all times.

To prevent the danger of undesirable current surges through the main machines during the regenerative period, the resistor R is provided to supplement the inherent beneficial effect, in this respect, of the regenerated-current-excited auxiliary field winding 11. Normally, as illustrated, the resistor R is short-circuited by the switch 2, the energizing circuit for which is established from the positive terminal of the battery B through conductor 44, coöperating stationary and movable contact members 45 of the low-current relay device 4 in its upper or closed position, coöperating contact members 46 of the high-current relay device in its lower or closed position, conductor 47, the actuating coil of the switch 2, and conductor 48 to the negative battery terminal.

Consequently, whenever the regenerated current exceeds a predetermined higher value corresponding to the setting of the relay device 3, the energizing circuit for the switch 2 is automatically interrupted by the lifting of the relay 3, and the resistor R is thus automatically inserted in circuit to reduce the regenerated current to a normal value.

Furthermore, the provision of the low-current relay device 4 insures that the resistor R is included in circuit whenever an undesirably low regenerated current that is below the setting of the relay 4 obtains, since the dropping of the relay device 4 to its lower position also interrupts the energizing circuit for the switch 2. Consequently, the resistor R will thus be normally included in circuit when the main machines are initially connected to the supply circuit, to prevent an objectionable rush of current.

The illustrated inter-relations of the main field winding sections that are respectively excited by the regenerated current and by the exciting-armature current tend to produce a relatively "flat" speed-torque operating characteristic for the main machines during the regenerative period, that is, a relatively slight variation of speed tends to produce a proportionally much larger change of braking torque. In case the opposite type or "steep" operating characteristic is desired, the circuit connections illustrated in Fig. 2 may be employed to good advantage.

The various machines and switching devices that were described in connection with Fig. 1 may also be utilized in the present system, as well as in the systems to be subsequently described, although, for the sake of simplicity and clearness, the auxiliary motor of the motor-generator set 1 and also the relay devices 3 and 4, together with the auxiliary sorce of energy B, have been omitted.

Assuming that regenerative operation has been inaugurated, the main circuit is established from ground, through conductor 50, normally closed switch 2, conductor 51, junction-point 52, where the circuit divides, one branch including conductor 53, lower section 54 of the main field winding $F^1$, conductor 55, armature $A^1$ and conductor 56 to another junction-point 57, and the other branch including conductor 58, lower section 59 of the main field winding $F^2$, conductor 60, main armature $A^2$ and conductor 61 to the junction point 57, whence a common circuit is continued through conductor 62, auxiliary field winding 11 and conductor 63 to the trolley.

The exciting circuit is established from the positive terminal of the auxiliary armature 7, through the field winding 10 and conductor 65 to the junction-point 52, where the circuit divides, one branch traversing conductor 53, upper section 66 of the main field winding F1 and conductor 67 to the junction-point, 68, and the other branch traversing conductor 58, upper section 69 of the main field winding F2 and conductor 70 to the junction-point 68, whence circuit is completed through conductor 71 to the negative terminal of the exciting armature.

As in Fig. 1, the regenerated current paths are indicated by solid arrows, while the direction of current in the exciting circuit is designated by dotted arrows. It will be observed, therefore, that each main armature energizes the lower section of the corresponding main field winding oppositely or differentially, with respect to the upper sections, which are excited from the auxiliary armature 7. Consequently, in case of an incipient increase of regenerated current in the armature A1, for example, the increased energization of the lower section 54 of the corresponding main field winding F1 causes the total excitation of the field winding to decrease in such manner that the voltage of the main armature A1 and, therefore, the current generated thereby are caused to subside to a normal value. The converse effect takes place in the event of an incipient decrease of regenerated current, and the other main armature A2 acts in a similar manner, as will be understood.

Thus, the desired substantially constant total regenerated current is again maintained by reason of the circuit connections of the auxiliary motor-generator set, while the regenerative load is equally divided between the two main machines at all times.

In Fig. 3, the circuit connections of the various machines under consideration are further modified and, in addition, a plurality of resistors R1 and R2 are included in certain circuits to be described.

Under regenerative conditions, the main circuit is completed from ground through conductor 75, normally closed switch 2, junction-point 76, where the circuit divides, one branch including resistor R1, junction-point 77, conductor 78 and main armature A1 to a further junction-point 79, and the other branch including resistor R2, junction-point 80, conductor 81, main armature A2 and conductor 82 to the junction-point 79, whence a common circuit is continued through conductor 83, auxiliary field winding 11 and conductor 84 to the trolley. The exciting circuit is established from the positive terminal of the auxiliary armature 7 through field winding 10, conductor 85, junction-point 76, where the circuit divides, one branch traversing resistor R1, main field winding F1 and conductor 86 to another junction - point 87, and the other branch traversing resistor R2, junction-point 80, main field winding F2 and conductor 88 to the junction-point 87, when circuit is completed through conductor 89 to the negative terminal of the auxiliary armature 7.

As indicated by the various solid and dotted arrows, the regenerated current traverses each resistor R1 and R2 in the same direction as the corresponding portion of the main - field - winding of exciting current. Consequently, upon an incipient increase of current through the main armature A1, the correspondingly increased voltage drop across the resistor R1 immediately and inherently causes a reduction of the voltage available for delivery to the main field winding F1 from the exciting armature 7, since the resistor R1 is also included in the exciting circuit. Thus, by a suitable proportioning of parts, the above-mentioned incipient increase of main armature current is counteracted and the desired substantially balanced generated current is maintained, since the converse regulating action takes place in the event of an attempted decrease of main-armature current.

Although the main-circuit resistor R is illustrated as being employed for the purpose set forth in connection with Fig. 1, in the present instance, if so desired, the combined resistors R1 and R2 may be utilized to fulfil this function and resistor R may be dispensed with.

Fig. 4 shows the same machine elements and resistors as Fig. 3, but a modified arrangement thereof is employed.

In this instance, the main regenerative circuit is established from ground through conductor 95, normally closed switch 2, junction-point 96, where the circuit divides, one branch including resistor R2, junction-point 97, conductor 98, and main armature A1 to a further junction-point 99, and the other branch including resistor R1, junction-point 100, conductor 101, main armature A2 and conductor 102 to the junction-point 99, whence a common circuit is continued through conductor 103, auxiliary field winding 11 and conductor 104 to the trolley.

The main-field-winding circuit is established from the positive terminal of the auxiliary armature 7 through field winding 10, conductor 105, junction-point 106, where the circuit divides, one branch traversing conductor 107, main field winding F1, junction-point 100 and resistor R1 to junction-point 96, and the other branch traversing conductor 108, main field winding F2, junction-point 97 and resistor R2 to junction-point 96, whence a common circuit is completed through conductor 109 to the negative terminal of the exciting armature 7.

As indicated by the corresponding solid and dotted arrows, each resistor R1 and R2 carries the difference between the associated portions of the regenerated or main-armature currents and the non-corresponding exciting or main-field-winding currents, since the main armatures A1 and A2 are connected to points intermediate the non-corresponding field-winding lower terminals and the resistors R2 and R1, respectively. Consequently, in case the armature A1 carries a temporary increase of regenerated current, the increased voltage drop across the non-corresponding resistor R2 causes the effective resistance thereof to decrease in proportion, by reason of the differential relation of the currents traversing the resistor, and thus, an increased voltage is impressed upon the main field winding F2. The result of such a condition is an increase in the voltage and current of the other main armature A2, which, therefore, automatically increases its load to cause an equal distribution of regenerated current between the two machines.

It will be seen that I have thus provided various relatively simple regenerative circuit connections for automatically maintaining a substantially constant total regenerated current during the retardation period and also for automatically balancing the load between the momentum-driven machines at all times.

I do not wish to be restricted to the specific circuit connections or relation of parts herein set forth, as various further modifications thereof may be made without departing from the spirit and scope of my invention. I desire, therefore, that only such limitations shall be imposed as are indicated in the appended claims.

I claim as my invention:

1. In a system of control, the combination with a plurality of main dynamo-electric machines severally having armatures and field windings, of an auxiliary machine for exciting said field windings and energized partially in accordance with the main-machine current and partially in accordance with auxiliary-machine current, and means for automatically maintaining a substantially equal distribution of load between the main-machines.

2. In a system of control, the combination with a plurality of main dynamo-electric machines severally having armatures and field windings, of an auxiliary machine for exciting said field windings and embodying circuit connections adapted to inherently maintain a substantially constant total main-machine current, and means for automatically balancing the load between the main machines.

3. In a system of regenerative control, the combination with a plurality of main dynamo-electric machines severally having armatures and field windings, of an auxiliary armature for exciting said field windings, a plurality of field windings for said auxiliary armature respectively energized by the regenerated current and the exciting current, and interconnections between the main armatures and main field windings whereby the regenerative load is automatically balanced at all times.

4. In a system of regenerative control, the combination with a plurality of main dynamo-electric machines severally having armatures and field windings, of an auxiliary armature for exciting said field windings, a plurality of differentially-related field windings for said auxiliary armature respectively energized by the regenerated current and the exciting current, and a plurality of resistors respectively connected in common circuits of non-corresponding main armatures and main field windings to carry the regenerated and exciting currents thereof in opposite directions.

5. In a system of regenerative control, the combination with a plurality of main dynamo-electric machines severally having armatures and field windings, of an auxiliary armature for exciting said field windings, means for inherently limiting the maximum regenerated current, and means for automatically balancing the load between the main machines.

6. In a system of regenerative control, the combination with a plurality of main dynamo-electric machines severally having armatures and field windings, of an auxiliary machine for exciting said field windings and embodying circuit connections adapted to inherently maintain a substantially constant total main-machine current, and means whereby an increase of current in the armature of one main machine inherently strengthens the field of another main machine.

7. In a system of regenerative control, the combination with a plurality of main dynamo-electric machines severally having armatures and field windings, of an auxiliary armature for exciting said field windings, a plurality of field windings for said auxiliary armature respectively energized by the regenerated current and the exciting current, and interconnecting circuits whereby an increase of current in the armature of one main machine inherently strengthens the field of another main machine.

In testimony whereof I have hereunto subscribed my name this 27th day of April, 1917.

RUDOLF E. HELLMUND.